United States Patent
Moriwaki et al.

(10) Patent No.: US 6,749,514 B1
(45) Date of Patent: Jun. 15, 2004

(54) GAME SYSTEM AND INFORMATION STORAGE MEDIUM

(75) Inventors: Jun Moriwaki, Ota-ku (JP); Hiroshi Watanabe, Ota-ku (JP); Takehiro Shimizu, Ota-ku (JP)

(73) Assignee: Namco Ltd., Tokyo (JP)

( * ) Notice: Subject to any disclaimer, the term of this patent is extended or adjusted under 35 U.S.C. 154(b) by 0 days.

(21) Appl. No.: 09/890,161

(22) PCT Filed: Oct. 24, 2000

(86) PCT No.: PCT/JP00/07428

§ 371 (c)(1),
(2), (4) Date: Aug. 27, 2001

(30) Foreign Application Priority Data

Nov. 30, 1999 (JP) .......................... 11-340658

(51) Int. Cl.[7] .......................... A63F 13/00; A63F 9/24; G06F 17/00; G06F 19/00
(52) U.S. Cl. .......................... 463/43; 463/31; 463/35; 345/419; 434/99
(58) Field of Search .......................... 463/1–9, 40–43, 463/31, 20, 35; 273/143 B; 345/419; 434/99

(56) References Cited

U.S. PATENT DOCUMENTS

| | | | |
|---|---|---|---|
| 5,830,065 A | * 11/1998 | Sitrick .......................... | 463/31 |
| 6,315,666 B1 | * 11/2001 | Mastera et al. .......................... | 463/31 |
| 6,340,330 B1 | * 1/2002 | Oishi et al. .......................... | 463/8 |
| 6,369,835 B1 | * 4/2002 | Lin .......................... | 345/726 |
| 6,428,414 B1 | * 8/2002 | Shimomura et al. .......................... | 463/31 |
| 6,478,679 B1 | * 11/2002 | Himoto et al. .......................... | 463/36 |

OTHER PUBLICATIONS

English translation of Super Famicon Dragonquest III Official Guide Book (Japan) p. 10.
English translation of Sarugecchu Manual (Japan) p. 49.
Play Station Kanpeki Kouryaku Series 39; Alone in the Dark 2 Hisshou Kouryaku kou, (Japan) Kabushiki Kaisha Souyousha, (Jul. 05, 1997) p. 5.
Konami Kanpeki Kouryaku Series 32; Jikkyou Powerful Pro–Yakuu '98 Kaimaku–ban Success Mode Konami K.K., (Mar. 20, 1999) p. 92.
Konami Kanpeki Kouryaku Series 28; Jikkyou Powerful Pro–Yakuu '98 Kaimaku Koushiki Kanzen Guide Book, (Japan) Konami K.K., (Sep. 01, 1998) p. 18.
Master Series; Nobunaga no Yabou; Tenshouki Master Book, (Japan) Kabushiki Kaisha Kouei, (Aug. 15, 1995) p. 19.
The Play Station Books "Yaru Dora" Kouryaku Series; Yukiwari no Hana, (Japan) Soft Bank K.K., (Dec. 17, 1998) p. 13.
Jugemu, No. 34 (Japan) Recruit (Feb. 01, 1998) p. 60.
Sarugecchu Manual (Japan) Sony Computer Entertainment, Tokkyoshou Shiryoukan p. 6.
Super Famicon Dragonquest III Official Guide Book (Japan) p. 10.
Sarugecchu Manual (Japan) p. 49 1996.

* cited by examiner

Primary Examiner—Teresa Walberg
Assistant Examiner—Robert Mendoza
(74) Attorney, Agent, or Firm—Oliff & Berridge, PLC

(57) ABSTRACT

There is provided a game system and information storage medium in which a player can easily grasp the contents of the saved data or the game state on the data saving. The game system can play a game based on a desired saved data when the desired saved data is selected and loaded from items of saved data. The game system has a saved-contents reminder image generating section (144) for generating a saved-contents reminder image containing at least one of scene and character which remind a player of the contents of the saved data or the game state on the data saving, and a load information selecting section (114) which outputs the saved-contents reminder image when a player selects saved data to be loaded. The contents of a frame buffer on the data saving may be used as a saved-contents reminder image. Moreover, a saved-contents reminder sound containing at least one of sound effects, BGM, character's voice which remind the player of the contents of the saved data or the game state on the data saving may be generated and outputted.

12 Claims, 11 Drawing Sheets

FIG. 8

| SAVE NUMBER | GAME STATE DATA | SAVED-CONTENTS REMINDER IMAGE GENERATION DATA | | |
|---|---|---|---|---|
| | | EXPRESSION CODE | ITEM CODE | BACKGROUND CODE |
| SAVE 1 | GAME STATE DATA OF SAVE 1 | 03 | NONE | 01 |
| SAVE 2 | GAME STATE DATA OF SAVE 2 | 02 | 03 | 04 |
| SAVE 3 | GAME STATE DATA OF SAVE 3 | 04 | 01,02 | 03 |
| SAVE 4 | GAME STATE DATA OF SAVE 4 | 01 | 01,02 | 02 |

700 SAVED DATA
710 SAVE NUMBER
720 GAME STATE DATA
730 ITEM CODE
740 EXPRESSION CODE
750 SAVED-CONTENTS REMINDER IMAGE GENERATION DATA
760 BACKGROUND CODE

GAME SYSTEM AND INFORMATION STORAGE MEDIUM

TECHNICAL FIELD

The present invention relates to a game system and the information storage medium.

BACKGROUND ART

Role-playing and action games have complicated stories. During play of a game, a plurality of alternatives are provided. Various developments of the game will be provided depending on the selection of the player. However, there are many days required to play all these developments of the game.

The game information is saved not only when the game is to be temporarily terminated but also when the player wants to save the game information at any point by way of caution. If the game information has been saved at an important or turning point during game play, the player can restart the game at the desired point by selecting it. Thus, the player can obtain a better development of the game by replaying the game from any other point different from the save point or in any different development of the game.

When the saved game information (which will be referred to "saved data") is to be loaded, the date on which the game information was saved and so on are displayed. The player selects any saved data to be loaded according to the displayed information. However, if the plural contents of the game have been saved, it is often difficult for the player to remember the saved contents of the game information or the state in which the game information was saved. If the player is to replay the game at the latest saving point, there is no problem. However, if the player is to replay the game at any particular point, the player may often waver in selection of the saved game contents.

It may be considered that characters are accessorily used to represent temporal and geographic information relating to the game space when the game contents were saved. This may facilitate the selection of the game information to be loaded.

However, only use of the characters does not provide any strong impact to the player. Therefore, it is still difficult that the player remember the contents and states of the saved game information.

DISCLOSURE OF THE INVENTION

The present invention is devised in the light of the above described problem, and has as an objective thereof the provision of a game system and information storage medium in which a player can easily grasp the contents and states of the saved data on the data saving.

(1) According to the present invention, there is provided a game system for playing a game by loading desired saved data selected from items of saved data, the game system comprising:

image generation means which generates a saved-contents reminder image including at least one of a scene and a character which remind a player of contents of the saved data or a game state on the data saving; and output means which outputs the saved-contents reminder image when a player selects the saved data to be loaded.

According to the present invention, there is also provided a computer-usable program embodied on an information storage medium or in a carrier wave, the program comprising information (or program) for implementing (or executing) the above described means. A computer-readable information storage medium according to the present invention comprises information (or a program) for implementing (executing) the above described means.

The saved-contents reminder image may be generated as a still image or as a dynamic image.

The time when the player selects the saved data to be loaded may be one when a load selection screen is displayed, for example. A plurality of saved-contents reminder images may be displayed at the same time. The saved-contents reminder images may be displayed individually.

The saved data generally contains game data from which the game can be restarted from the state on the data saving. The game data may include positional and temporary parameters representing a save point, parameters relating to a character on the data saving, or numerical values required for the game computation of acquired items, scores and so on.

The state on the data saving may include a location, a state of a character, a degree of growth of a character, a objective situation showing whether or not the game situation is advantageous for the player, and so on.

According to the present invention, the saved-contents reminder image which reminds the player of the contents of the saved data is displayed when the player is to select the saved data to be loaded. Such a saved-contents reminder image provides a stronger impact to the player in comparison with the prior art in which only letters representing the time and location on the data saving are outputted. Thus, the player can easily remember the contents of the saved data or the game state on the data saving while viewing the saved-contents reminder image.

Therefore, the present invention can provide a game system and information storage medium in which the player can easily grasp the contents of the saved data and the game state on the data saving.

(2) Each of the game system, information storage medium and program according to the present invention may further comprise means which performs a game direction in which at least one of scene and character images in a game space is taken on the data saving, wherein the saved-contents reminder image is generated based on the taken image.

According to the present invention, at least one of a scene and character images in the game space is taken on the data saving. The saved-contents reminder image is generated based on the taken image. Thus, the state on the data saving is linked with that image. The linking leaves a strong impression in the player. The generated saved-contents reminder image can cause the player to easily grasp the contents of the saved data and the state on the data saving.

When the imaging is carried out on the data saving, it adds a further active-element to the saving operation. This makes the game more interesting.

(3) In each of the the game system, information storage medium and program according to the present invention, when the saved-contents reminder image is generated, a direction reflecting a state of the character or the player on the data saving may be performed for at least one of expression or motion of the character, weather or season or time of the scene and contents of background, in the saved-contents reminder image.

The direction reflecting the situation of the character on the data saving on the expression of the character includes the generation of a character image having its troubled, angry or laughing face, for example.

The direction reflecting the situation in which the character has been placed on the data saving may be performed for the weather in a scene, that is, the generation of a scene image representing signs of a coming rain when the character weeps on the data saving or an unclouded sky when the character be pleased, for example.

If the player is in a favorable position on the data saving, an image representing a tree in full bloom may be generated. If the player is not in a favorable position on the data saving, an image having dead trees in the background may be generated.

According to the present invention, a game system and information storage medium in which the player can immediately judge the game state on the data saving from the saved-contents reminder image can be provided by performing a direction reflecting the state of the character or player on the data saving for at least one of the expression or motion of the character, the weather or season or time of the scene and the contents of the background, in the saved-contents reminder image.

Since the saved-contents reminder image modified by the direction reflecting the situation of the character or player on the data saving is displayed, the present invention can provide a game system and information storage medium in which a player is amused by the saved-contents reminder image itself.

(4) Each of the the game system, information storage medium and program according to the present invention may further comprise: storing means which stores information for generating an image displayed on data saving in association with the saved data; and means which generates the image displayed on the data saving as the saved-contents reminder image.

The image displayed on the data saving is an image displayed when a player inputs a save command, for example. Data necessary for generating such an image includes image data stored in a frame buffer when the player inputs the save command, for example.

The image displayed on the data saving is not limited to a still image, and may be a dynamic image. For example, images of a plurality of frames may be saved and used to generate an animated saved-contents reminder image.

Sounds outputted on the data saving, such as character voices, BGM, sound effects and so on, may be saved and later outputted together with the saved-contents reminder image.

According to the present invention, the image displayed on data saving can be outputted as a saved-contents reminder image. Thus, the game state on the data saving can make a stronger appeal to the player. As a result, the present invention can provide a game system and information storage medium in which the game state on the data saving can easily be grasped by the player.

(5) In each of the the game system, information storage medium and program according to the present invention, the saved-contents reminder image containing an item possessed by a player's character on the data saving may be generated.

According to the present invention, since an item possessed by the player's character can be included in the saved-contents reminder image, a game system and information storage medium wherein the player can grasp the contents of the saved data getting a clue from that item can be provided.

(6) Each of the the game system, information storage medium and program according to the present invention may further comprise: means for generating a saved-contents reminder sound including at least one of sound effects, BGM and character voice which remind the player of the contents of the saved data or the game state on the data saving; and output means which outputs the saved-contents reminder sound when the player selects the saved data to be loaded.

Sounds which remind the player of the contents of the saved data or the game state on the data saving include, for example, a sound of the sea if the location on the data saving is a seashore, a sound of wind if a strong wind is blowing, and a cry of an animal if it exists near the character.

According to the present invention, since the saved-contents reminder sound is outputted when the player selects the saved data to be loaded, a game system and information storage medium in which the game state on the data saving can easily be grasped by hearing can be obtained.

Timing when the saved-contents reminder sound is outputted may be either of when a cursor is positioned on any item in the corresponding saved data or when the item of the corresponding saved data is selected.

(7) The present invention further provides a game system in which desired saved data is selected from items of saved data and loaded, the game system comprising:

generating means which generates a saved-contents reminder sound containing at least one of sound effects, BGM and character voices that remind a player of contents of the saved data or a game state on the data saving; and output means which outputs the saved-contents reminder sound when the player selects the saved data to be loaded.

According to the present invention, there is also provided a computer-usable program embodied on an information storage medium or in a carrier wave, the program comprising information (or program) for implementing (or executing) the above described means. A computer-readable informatin storage medium according to the present invention comprises information (or a program) for implementing (executing) the above described means.

Sounds which remind the player of the contents of the saved data or the game state on the data saving includes a sound of the sea if the location on the data saving is a seashore, a sound of wind if a strong wind is blowing, and a cry of an animal if it exists near the character, for example. Moreover, such sounds may be a sound that is characteristic of the character on the data saving.

According to the present invention, since the saved-contents reminder sound is outputted when the player selects the saved data to be loaded, a game system and information storage medium in which the game state on the data saving can easily be grasped by hearing can be obtained.

Timing when the saved-contents reminder sound is outputted may be either of when a cursor is positioned on any item in the corresponding saved data or when the item of the corresponding saved data is selected.

(8) In each of the the game system, information storage medium and program according to the present invention, the saved-contents reminder image or the saved-contents reminder sound may be generated based on a parameter of the character on the data saving.

The parameters of the character includes variables representing the strength, compatibility, growth or the like of the character, and these variables are used in the game computation. If the strength of the character is low, the saved-contents reminder image is generated to include an image of a weedy character, and if the compatibility is high, the saved-contents reminder image is generated to include a pink-colored background or a background with a heart mark, for example.

By generating the saved-contents reminder image based on the parameters, the image can remind the player of the state of the character on the data saving, since the parameters are variable depending on the game situation of the character.

(9) Each of the the game system, information storage medium and program according to the present invention may further comprise: edition means which enables the player to edit at least one of the saved-contents reminder image and the saved-contents reminder sound on the data saving.

In such an arrangement, the player can edit at least one of the saved-contents reminder image and the saved-contents reminder sound in the saved data when the player saves the game data.

The edition of the saved-contents reminder image includes combination of partial images, selection of favorable images, and modification of the color, pattern or background of images, for example. The edition of the saved-contents reminder sound includes selection or combination of the character voices, BGM and sound effects, for example.

If the player edits the saved-contents reminder image on sound, the edited image or sound can provide a stronger impression to the player, so that the player can more easily remind the contents of the saved data.

BRIEF DESCRIPTION OF THE DRAWINGS

FIG. 8 is a table representing an example of the contents of the saved data in this embodiment.

BEST MODE FOR CARRYING OUT THE INVENTION

A preferred embodiment of the present invention will now be described with reference to the drawings. Although the present invention will be described as to a role-playing game, it is not limited to this but may be applied to any of various other games.

1. Configuration

Figure 1:
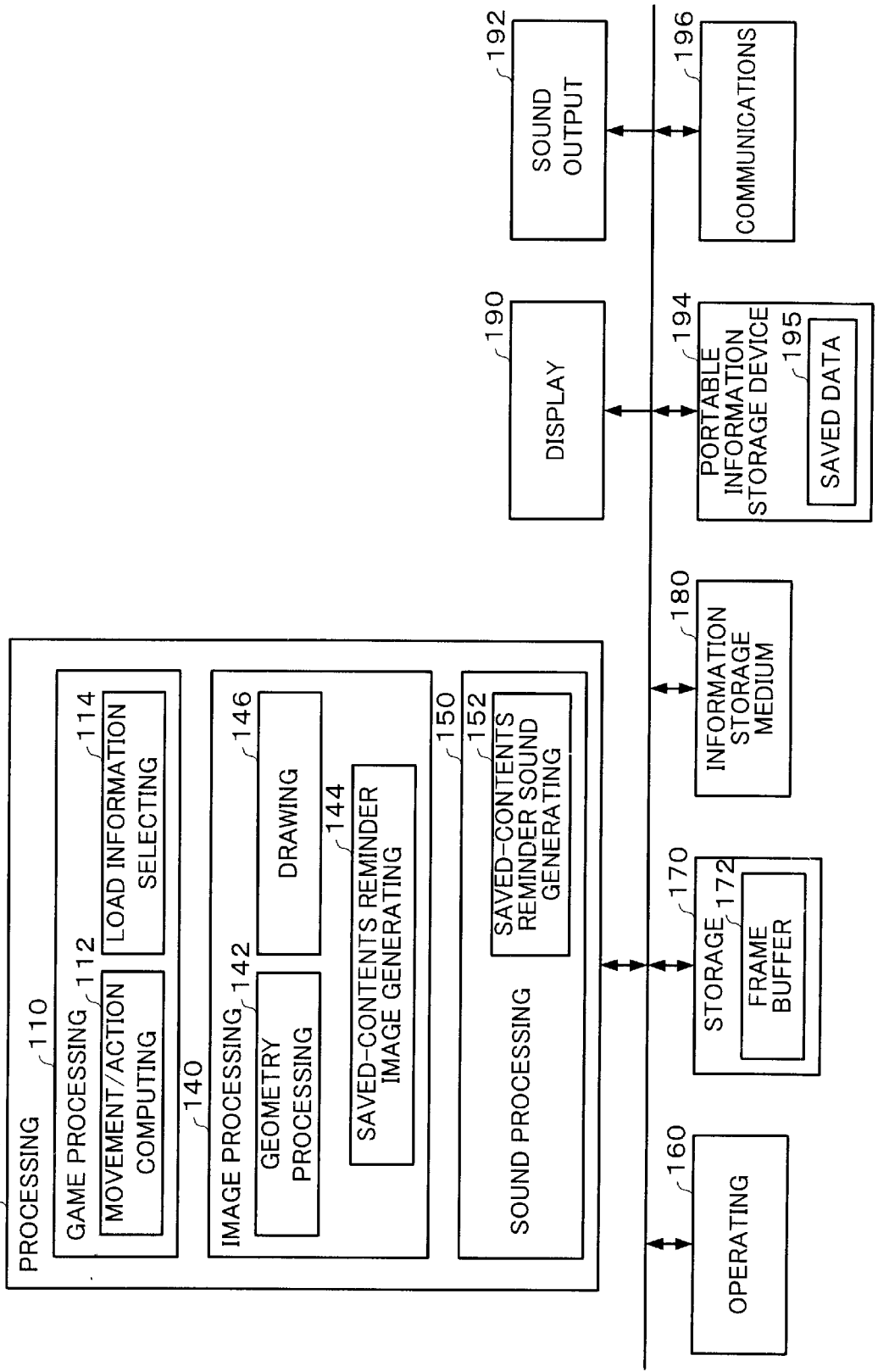
FIG. 1 is a functional block diagram of a game system according to the embodiment of the present invention.

FIG. 1 shows a block diagram of this embodiment. In this figure, this embodiment may comprise at least a processing section 100 or a processing section 100 with a storage section 170 or a processing section 100 with a storage section 170 and an information storage medium 180. Each of the other blocks (e.g., operating section 160, display section 190, sound output section 192, portable information storage device 194 and communications section 196) may take any suitable form.

The processing section 100 performs various processings for control of the entire system, commands to the respective blocks in the system, game processing, image processing, sound processing and so on. The function thereof may be realized through any suitable hardware means including various processors such as CPU, DSP and so on or ASIC (or gate array or the like) or a given program (or game program).

The operating section 160 is used to input operational data from the player and the function thereof may be realized through any suitable hardware means such as a shooting device, a lever, a button, a housing or the like.

The storage section 170 provides a working area for the processing section 100, communications section and others. The function thereof may be realized by any suitable hardware means such as RAM or the like. The storage section 170 includes a frame buffer 172.

The information storage medium (or a computer-readable storage medium) 180 stores information such as a program or data). The function thereof may be realized through any suitable hardware means such as an optical memory disk (CD or DVD), a magneto-optical disk (MO), a magnetic disk or a memory (ROM) The processing section 100 performs various processings in the present invention (or this embodiment) based on the information stored in this information storage medium 180. In other words, the information storage medium 180 stores various pieces of information (or a program, or program and data) for implementing the means of the present invention (or this embodiment) which is particularly the block included in the processing section 100.

Part or the whole of the information stored in the information storage medium 180 will be transferred to the storage section 170 when the system is initially powered on. The information stored in the information storage medium 180 may contain at least one of program code set for processing the present invention, image data, sound data, shape information of objects to be displayed, table data, list data, command information for the processings in the present invention, information for performing the processings according to the commands and so on.

The display section 190 is to output an image generated according to this embodiment. The function thereof may be realized through any suitable hardware means such as CRT, LCD or HMD (head mount display).

The sound output section 192 is to output a sound generated according to this embodiment. The function thereof may be realized through any suitable hardware means such as a speaker or the like.

The portable information storage device 194 is to store a player's personal data or saved data 195. The portable information storage device 194 may be considered to be a memory card or a portable game system.

The communications section 196 is to perform various controls for performing the communication between the game system of the present invention and any external means (e.g., a host machine or the other image generating system). The function thereof may be realized through any hardware means such as various processors or communication ASIC or according to a program.

The programs or data used for executing the means of the present invention (or this embodiment) may be distributed from an information storage medium included in the host machine (or server) to the information storage medium 180 through a network or the communications section 196. The use of such an information storage medium included in the hose device (or server) falls within the scope of the invention.

The processing section 100 comprises a game processing section 110, an image processing section 140 and a sound processing section 150.

The image processing section 110 performs various processes such as coin (or charge) reception, setting of various modes, game proceeding, setting of scene selection, determination of the position and rotation angle (about X-, Y- or Z-axis) of an object, processing relating to the motion of an object (motion processing), determination of the view point and visual line (direction), arrangement of an object such as a map object within the object space, hit checking, computation of the game results (or scores), processing for causing a plurality of players to play in a common game space, various game computations including game-over and other processes, based on operational data from the operating section 160, personal data from the portable information storage device 194, saved data and game programs.

The image processing section 140 is to process various images according to instructions from the game processing section 110. The sound processing section 150 is to process various sounds according to instructions from the game processing section 110.

The functions of the image processing section 140 and sound processing section 150 may entirely be realized through hardware or according to programs or by both the hardware and programs.

The game processing section 110 includes a movement/action computing section 112 and a load information selecting section 114.

The movement/action computing section 112 is to compute the movement information of an object such as a target or the like (including positional data, rotational angle data and so on), the action information of the object (including positional data and rotational angle data of each part in the object) or the trajectory. For example, the movement/action computing section 112 may move or operate the object based on such operational data as inputted by a player through the operating section 160 or the game programs.

More particularly, the movement/action computing section 112 may determine the position or rotational angle of the object for each frame (1/60 seconds). It is now assumed herein that the position of the object for (k−1) frame is PMk−1; the speed thereof is VMk−1, the acceleration thereof is Amk−1 and time for one frame is Δt. The position PMk and speed VMk of the object for k frame can be determined from the following formulas (1) and (2):

$$PMk=PMk-1+VMk-1\times\Delta t \quad (1)$$

$$VMk=VMk-1+Amk-1\times\Delta t \quad (2)$$

The load information selecting section 114 is to output a load selection screen for selecting saved data to be loaded and to set a load onset circumstance by loading the selected saved data.

The image processing section 140 includes a geometry processing section (three-dimensional coordinate computing portion) 142, a player color directing portion 144 and a drawing (or rendering) portion 146.

The geometry processing section 142 is to perform various geometry processings (or three-dimensional computations) such as coordinate transformation, clipping, perspective transformation and light-source calculation.

The saved-contents reminder image generating section 144 is to generate a saved-contents reminder image containing at least one of a scene and character which remind the player of the contents of the saved data or the state on the data saving.

In the saving, by directing the game such that at least one of the character and scene images within the game space is taken, the saved-contents reminder image may be generated based on the taken image.

The saved-contents reminder image may be generated by so directing that the state of the character or player on the data saving is reflected to at least one of the expression or action of the character, the weather, season or time of the scene and the contents of the background in the saved-contents reminder image.

An image in the frame buffer on the data saving may be generated as a saved-contents reminder image.

The drawing section 146 is to draw an object based on the object data after the geometry processing (or perspective transformation) and a texture stored in a texture buffer.

The drawing section 146 may perform the drawing process by mapping and superimposing the modified texture on the object and a correcting object having different texture coordinates for each vertex.

The sound processing section 150 includes a player sound directing section 152.

The saved-contents reminder sound processing section 152 is to generate a saved-contents reminder sound containing at least one of the sound effects, BGM and character voices which remind the player of the contents of the saved data or the state on the data saving.

The image generating system of this embodiment may be dedicated for a single-player mode in which only a single player can play the game or may have a multi-player mode in which a plurality of players can play the game.

If a plurality of players play the game, only a single terminal may be used to generate game images and sounds to be provided to all the players. Alternatively, a plurality of terminals interconnected through a network (transmission lien or communication line) may be used in the present invention.

2. Features of this Embodiment

Figure 2:
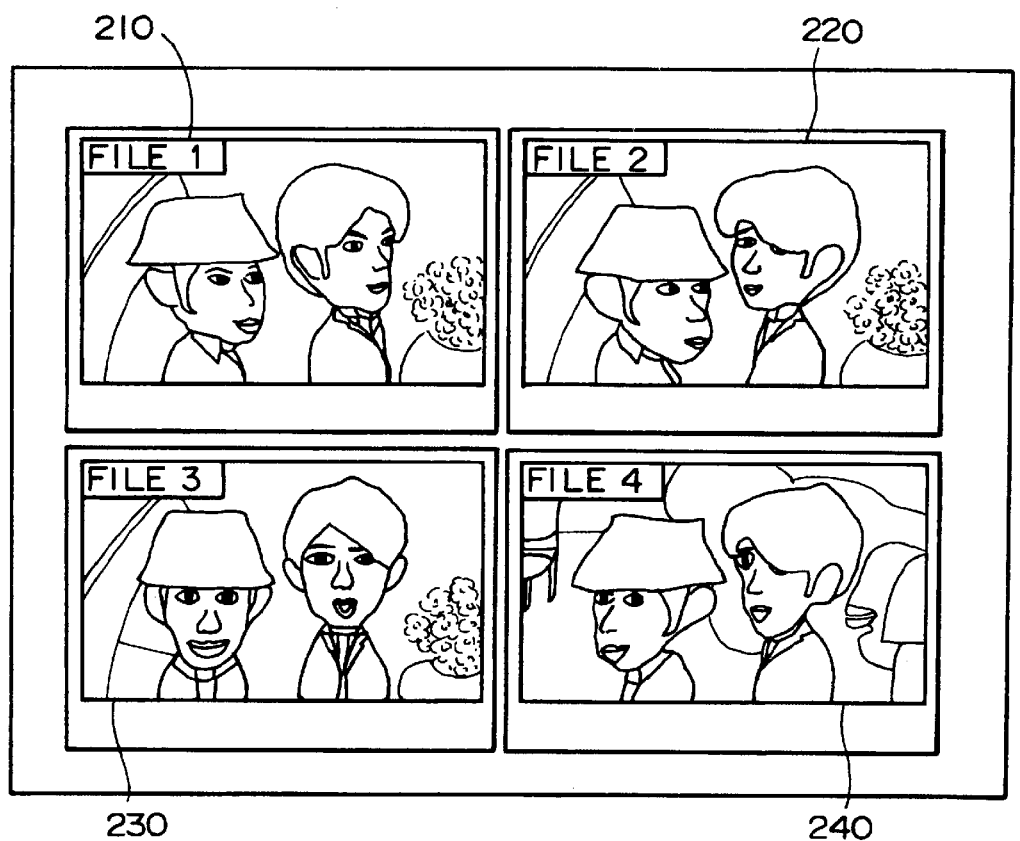
FIG. 2 is a view illustrating a load selection screen in the embodiment.

FIG. 2 shows a load selection screen according to this embodiment, which is a scene displayed when saved data to be loaded in a game system is to be selected.

According to this embodiment, as shown in FIG. 2, saved-contents reminder images 210, 220, 230 and 240 are displayed which remind the player of the contents of saved information pieces FILE 1, FILE 2, FILE 3 and FILE 4 respectively.

Each of the saved-contents reminder images consists of a character and a landscape at a place in which the character exists on the data saving. As will be apparent from the saved-contents reminder images 210, 220, 230 and 240, the face expression of the respective character is reflected by the state on the data saving. Therefore, a player can select a file to be loaded by grasping the saved contents of information while viewing the images 210, 220, 230 and 240.

The feature of this embodiment is to generate a saved-contents reminder image containing at least one of the landscape and character which remind the player of the contents of the saved data or the state on the data saving and to output such a saved-contents reminder image when the player is to select saved data to be loaded.

Figure 3:
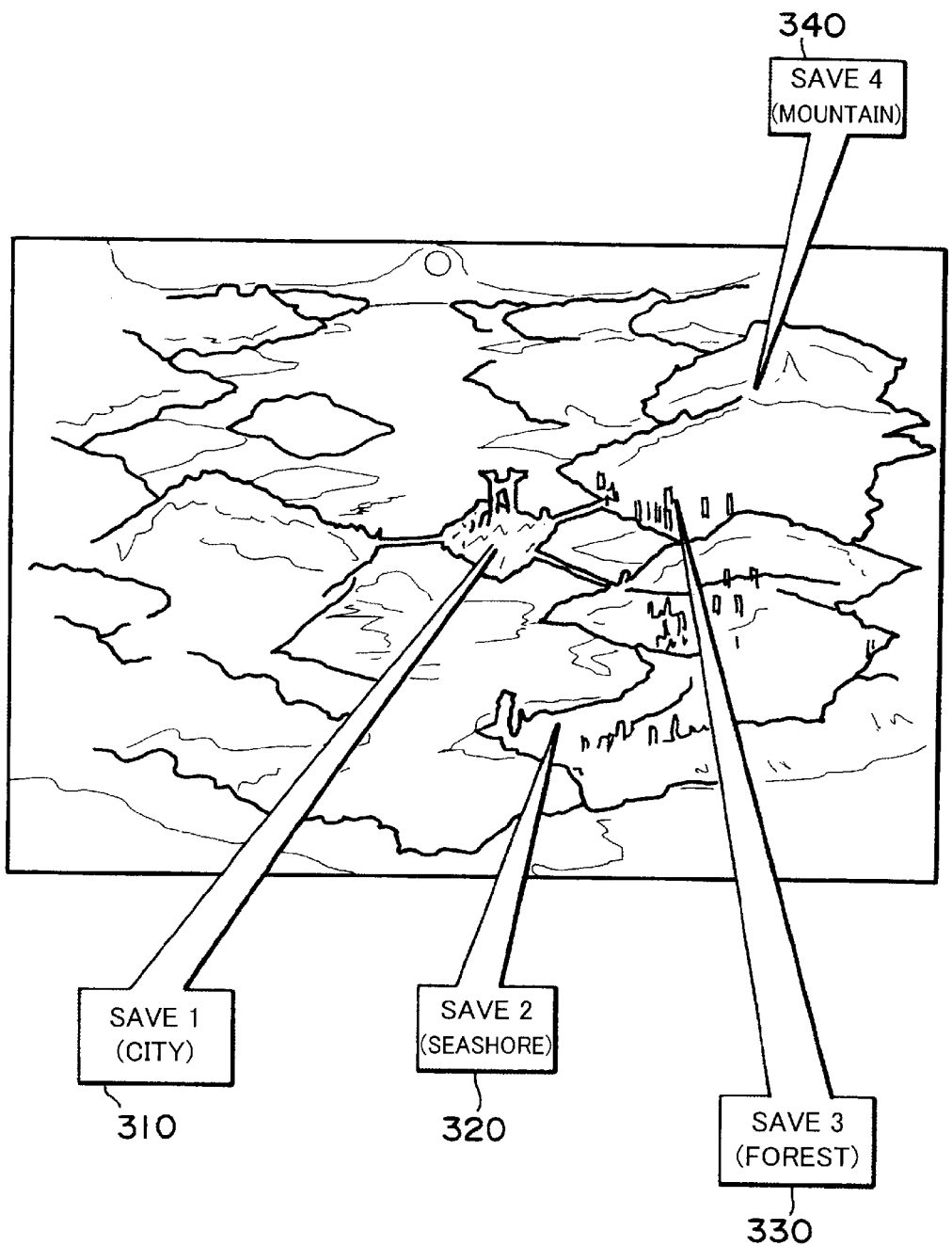
FIG. 3 is a view showing a game space in which the game of the embodiment is played.

The saved-contents reminder image will be described in more detail in connection with a simple game story, "Adventures of Tom and Pete". FIG. 3 shows a perspective view illustrating a game space which is a stage for the game, "Adventures of Tom and Pete", according to this embodiment. The game space is a wonderland having a diversified configuration consisting of cities, seashores, forests, mountains and so on. Tom and Pete will repeatedly do various adventures in the wonderland to get treasures.

Tom and Pete compete with each other relating to which can first get a treasure. An adventure starts at a city. Where are they going? For the meantime, a first save is performed (Save 1 shown by 310 in FIG. 3).

Tom moves from the city toward a seashore. He picks up twigs in a forest and safely reaches the seashore. However, Tom is puzzled what to do. For the meantime, a second save is performed (Save 2 shown by 320 in FIG. 3).

Pete moves from the city toward a mountain. Pete picks up a sword and a shield in another forest and feels lucky. For the meantime, a third save is performed (Save 3 shown by 330 in FIG. 3).

Pete further proceeds and reaches the base of another mountain. Here, he finds a pot which is a new and important item. At a moment when Pete is to pick up the pot, a hawk carries away it. "Oh, no!"

Since the hawk has flown to the top of the mountain with the pot, Pete decides to climb the mountain and to get back the pot. However, it appears that the mountain may be dangerous. For the meantime, a fourth save is performed (Save 4 shown by 340 in FIG. 3). Tom and Pete will continue their severe travels.

As the game proceeds in such a development, a game information piece required to restart the game at each of the Saves 1 to 4 is saved in an information storage medium as the corresponding one of the saved data 1 through 4.

This embodiment generates a saved-contents reminder image from which the contents of each saved data can be grasped when saved data to be loaded is to be selected. Since the saved-contents reminder image is outputted in the load selection screen or the like, the player can remember the contents of the corresponding saved data while viewing the saved-contents reminder image being displayed.

Figure 4:
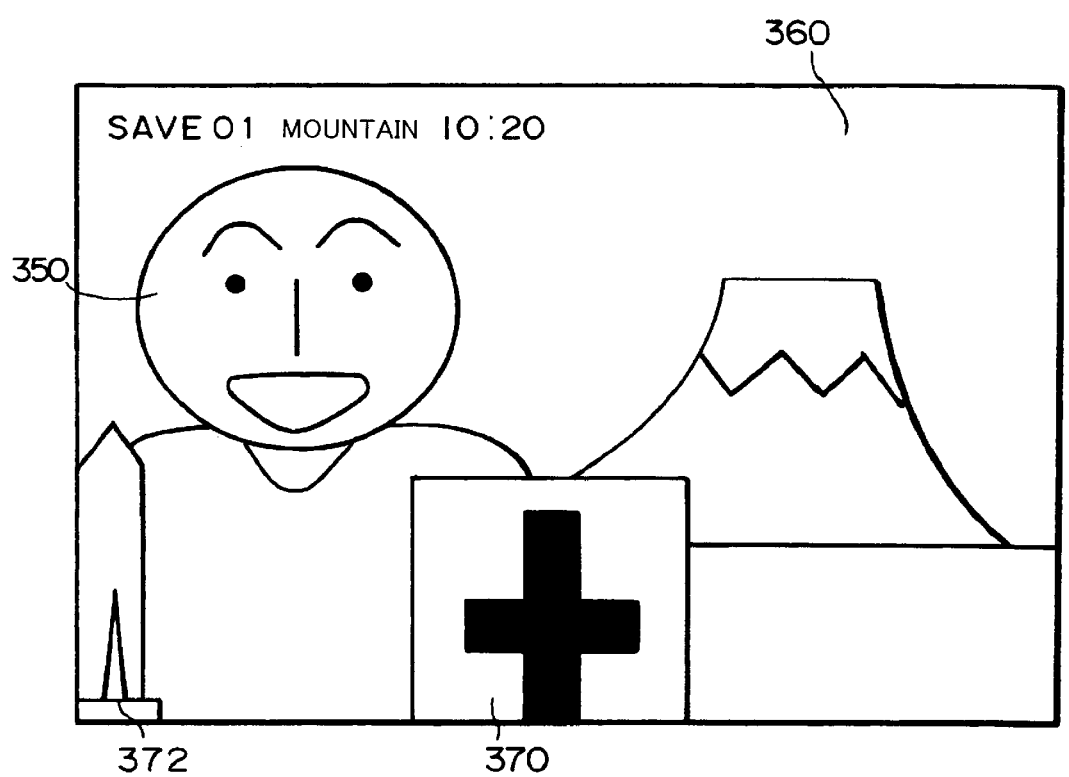
FIG. 4 is illustrative of the saved-contents reminder image according to this embodiment.

FIG. 4 is a view illustrating the configuration of a saved-contents reminder image according to this embodiment. The saved-contents reminder image according to this embodiment includes a character 350 having its face expression which is reflected by the development of game, a background image 360 representing a landscape at which the character exists, and if necessary, item images 370 and 372.

Figure 5:
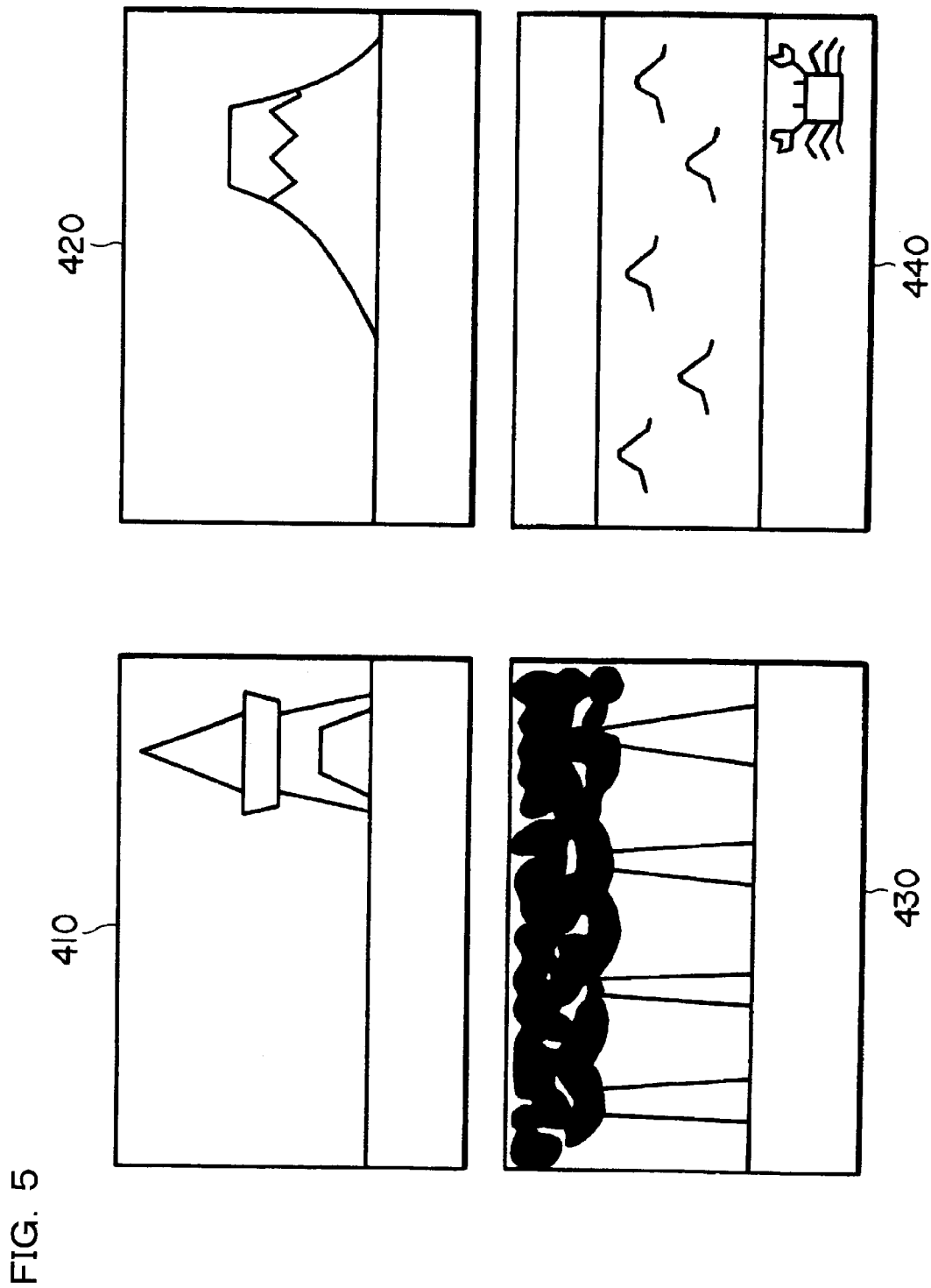
FIG. 5 shows examples of a background image in the saved-contents reminder image of this embodiment.

FIG. 5 shows several examples of background images in a saved-contents reminder image according to this embodiment. Background 1 (410) is the scene of a city; background 2 (420) is the scene of a mountain; background 3 (430) is the scene of a forest; and background 4 (440) is the scene of a seashore.

One of these scenes at which a character exists on the data saving will be used as a background in the saved-contents reminder image according to this embodiment. For example, if the save is performed when the character exists in the city as in Save 1 (310 of FIG. 3), the background 1 (410) is used as the background image in the saved-contents reminder image.

If the save is performed when the character exists in the seashore as in Save 2 (320 of FIG. 3), the background 4 (440) is used as the background image in the saved-contents reminder image.

If the save is performed when the character exists in the forest as in Save 3 (330 of FIG. 3), the background 3 (430) is used as the background image in the saved-contents reminder image.

If the save is performed when the character exists in the mountain as in Save 4 (340 of FIG. 3), the background 2 (420) is used as the background image in the saved-contents reminder image.

In this embodiment, one scene from several scenes at which the character exists on the data saving is used as a background image in the saved-contents reminder image. Therefore, the player can grasp the place on the data saving or the contents of the saved data while viewing this background image.

Figure 6:
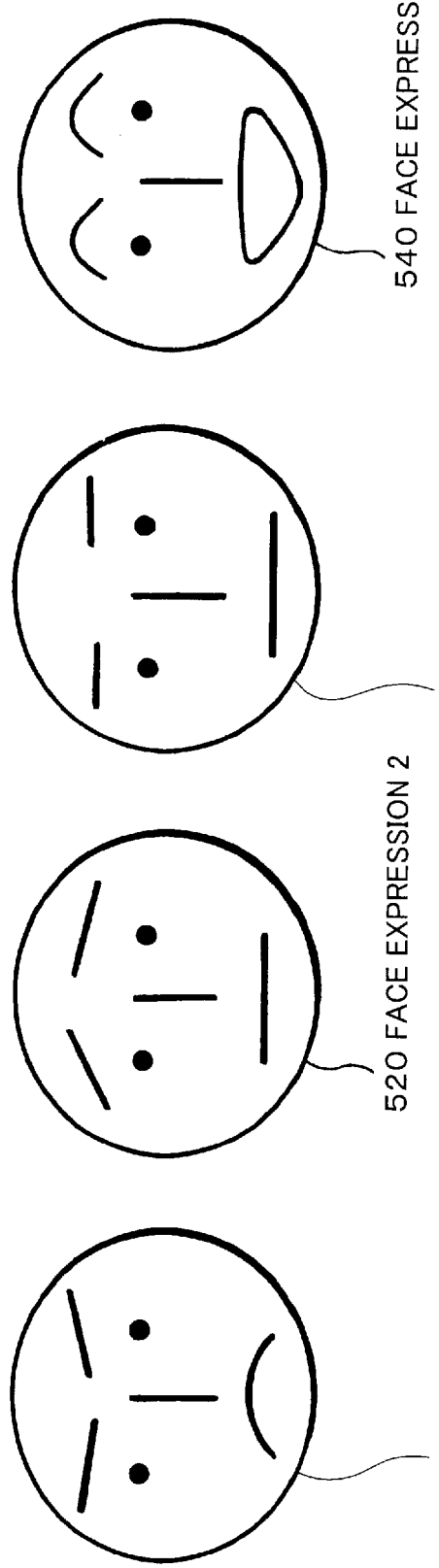
FIG. 6 shows examples of the face expression of a character in the saved-contents reminder image of this embodiment.

FIG. 6 shows several examples of the character's face expressions in the saved-contents reminder image according to this embodiment. Expression model 1 (510) represents an angry look; expression model 2 (520) represents a troubled look; expression model 3 (530) represents a normal look; and expression model 4 (540) represents a laughing look.

The saved-contents reminder image according to this embodiment includes the face of a character reflected by the development of game. For example, if the character does not still start the adventure as in Save 1, the expression model 3 (530) representing the normal look is used as the face of the character in the saved-contents reminder image.

If the character is puzzled as in Save 2, the expression model 2 (530) representing the troubled look is used as the face of the character in the saved-contents reminder image.

If the character delights in getting a new item as in Save 3, the expression model 4 (540) representing the laughing look is used as the face of the character in the saved-contents reminder image.

If the character is angry since his important item is carried away as in Save 4, the expression model 1 (510) representing the angry look is used as the face of the character in the saved-contents reminder image.

Since the character having its face expression reflected by the development of game is thus used in the saved-contents reminder image in this embodiment, the player can grasp the state on the data saving or the contents of the saved data from the face expression of the character.

Figure 7:
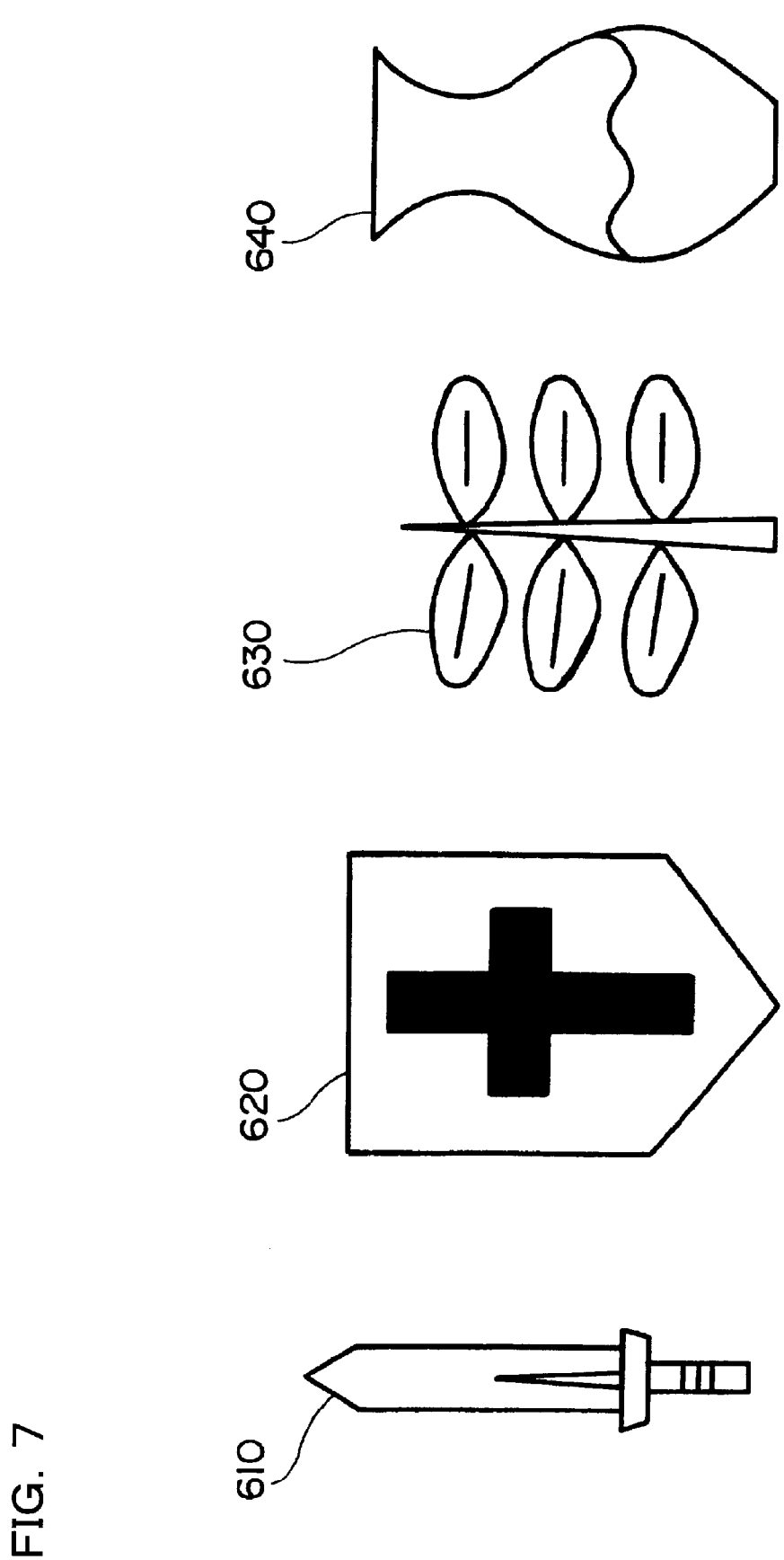
FIG. 7 shows examples of an item image in the saved-contents reminder image of this embodiment.

FIG. 7 shows several examples of item images in the saved-contents reminder image according to this embodiment. Item 1 (610) represent a sword; item 2 (620) represents a shield; item 3 (630) represents a twig; and item 4 (640) represents a pot.

The saved-contents reminder image of this embodiment may be configured to include one or more item images possessed by the character, if necessary.

In Save 1, for example, the character has no item since it does not start the adventure. Therefore, no item is shown in the saved-contents reminder image.

In Save 2, the item 3 (630) representing the twig is used in the saved-contents reminder image since the save was performed when the character had the twig.

In Saves 3 and 4, the items 1 (610) and 2 (620) are used in the saved-contents reminder image since the save was performed when the character had the sword and shield.

In this embodiment, one or more items possessed by the character are used in the saved-contents reminder image. Therefore, the player can remember the state on the data saving or the contents of the saved data from the used items.

New information for generating the saved-contents reminder image may be saved in addition to the previous saved data. Alternatively, the saved-contents reminder image may be generated based on the same contents of save information as the previous save information through a predetermined algorithm.

FIG. 8 shows the structure of saved data according to this embodiment.

The saved data 700 comprises save numbers 710, game state data 720 and saved-contents reminder image generation data 730. The game state data 720 is inherently necessary to start the game from each state on the data saving irrespectively of whether or not the saved-contents reminder image should be generated.

The saved-contents reminder image generation data 730 is necessary to generate or edit the saved-contents reminder image and contains expression codes 740, item codes 750 and background codes 7.

The expression codes 740 can best represent the conditions in which the character is placed on the data saving (see FIG. 5). The item codes 750 correspond to distinctive items which are possessed by the character on the data saving (see FIG. 6). The distinctive items may include items or others which are last possessed by the character. The background codes 760 correspond to backgrounds in which the character existed on the data saving.

If the saved-contents reminder image generation data have been set on the data saving, the saved-contents reminder image can be generated at higher speeds without referring to the contents of any other saved data.

Figure 9:
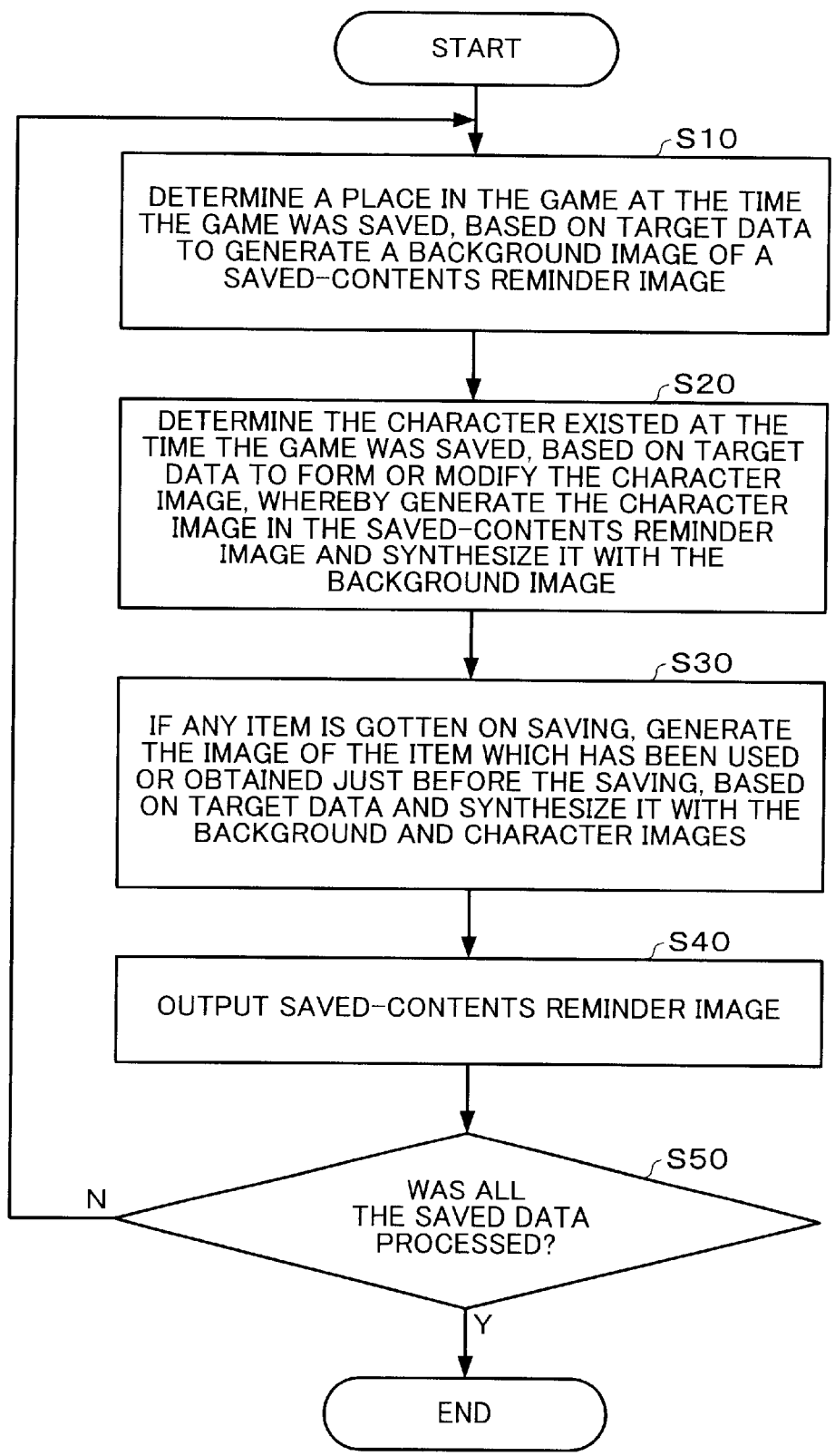
FIG. 9 is a flowchart illustrating an operation in this embodiment.

FIG. 9 is a flowchart illustrating a process for generating the saved-contents reminder image based on the saved game information.

In this embodiment, steps S10 through S50 for each saved data are executed to generate the saved-contents reminder image until the process has been completed for all the saved data.

A place in the game at the time the game was saved is first determined, based on the target data, and then a background image of the saved-contents reminder image is generated (step S10). At this time, the contents of the saved data may be referred to when the background image in the saved-contents reminder image is to be generated. Alternatively, such a saved-contents reminder image as described in connection with FIG. 8 may be referred to.

A character existed at the time the game was saved is then determined, based on the target data. The face expression of that character is formed or modified to generate the image of the character in the saved-contents reminder image, which is in turn synthesized with the background image (step S20). For example, if data for generating the saved-contents reminder image is used, the face expression of the character may be generated from the expression code.

If any item is gotten at the time the game was saved, the image of the item which has been used or obtained just before the saving is generated based on the target data and it is synthesized with the background and character images (step S30) For example, if the data for generating the saved-contents reminder image is used, the item image may be generated from the item code.

The saved-contents reminder image which includes the background and character images and if necessary, includes also the item image is output (step S40).

These steps S10 to S40 will be repeated until all the saved data have been processed (step S50).

3. Hardware Configuration

Figure 10:
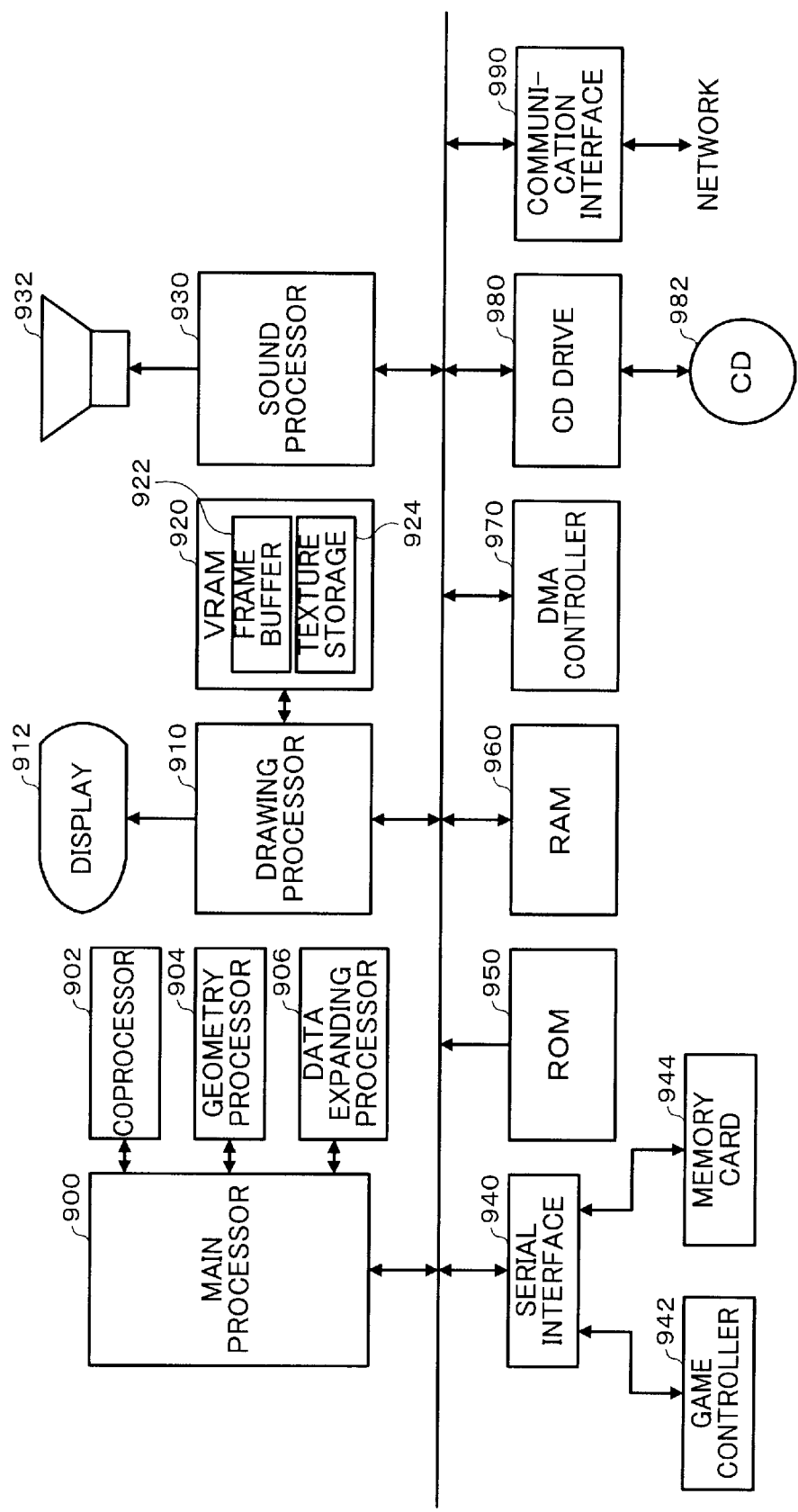
FIG. 10 shows hardware configuration for implementing the embodiment of the present invention.

Hardware configuration for implementing this embodiment will be described with reference to FIG. 10.

A main processor 900 operates to perform various processings such as game processing, image processing, sound processing and so on, based on a program stored in a CD 982 (information storage medium), a program transmitted through a communication interface 990 or a program stored in a ROM 950 (which is one kind of information storage medium).

A coprocessor 902 aids the main processor 900 and has a product-sum operator and divider which can perform a high-speed computation. Thus, the coprocessor 902 can execute a matrix (or vector) computation at high speed. For example, if the matrix computation or the like is required to perform the movement or motion of an object, a program running on the main processor 900 commits its own process to the coprocessor 902.

A geometry processor 904 is to perform a geometry processing for coordinate transformation, perspective transformation, light-source calculation, curve generation and so on and has a product-sum operator and divider which can perform a high-speed computation. Thus, the geometry processor 904 can execute a matrix (or vector) computation at high speed. For example, if a processing such as coordinate transformation, perspective transformation or light-source calculation is to be performed, a program running on the main processor 900 commits its own processing to the geometry processor 904.

A data expanding processor 906 is to expand and decode compressed image or sound data or to accelerate the decoding process in the main processor 900. Thus, a dynamic image compressed through MPEG or other can be displayed in an opening scene, intermission scene, ending scene or game scene. Image and sound data to be decoded may be stored in the ROM 950 and CD 982 or may externally be transferred through the communication interface 990.

A drawing processor 910 is to perform, at high speed, a process of drawing (or rendering) an object which is formed by primitive faces such as polygons or curves. When the object is to be drawn, the main processor 900 uses a DMA controller 970 to deliver the object data to the drawing processor 910 and if necessary, to transfer textures to a texture storage section 924. Thus, the drawing processor 910 uses the object data and textures to draw the object in a frame buffer 922 at high speed while performing the hidden-surface removal through a Z-buffer or the like. Moreover, the drawing processor 910 can also perform alpha($\alpha$)-blending (or translucency processing), mip-mapping, fogging, tri-linear filtering, anti-aliasing, shading and so on. When an image for one frame has been written into the frame buffer 922, its image will be displayed on a display 912.

A sound processor 930 includes a multi-channel adaptive differential pulse code modulation (ADPCM) sound source and others for generating high-quality game sounds such as BGM, sound effects, voices and so on. The generated game sounds may be outputted through a speaker 932.

The operational data from a game controller 942 as well as the saved data and personal data from a memory card 944 may be transferred through a serial interface 940.

The ROM 950 has stored system programs and so on. For an arcade game system, the ROM 950 serves as an information storage medium for storing various types of programs. In place of the ROM 950, any hard disk may be used.

RAM 960 is used as a working area for various processors.

The DMA controller 970 functions to control DMA transfer between the processors and the memories (RAM, VRAM, ROM and the like).

CD drive 980 can drive the CD 982 (information storage medium) which has stored the programs, image data or sound data for accessing them.

The communication interface 990 functions to perform the data transfer between the game system and any external means through a network. In such a case, the network connectable to the communication interface 990 may be in the form of a communication line (i.e., analog telephone line or integrated services digital network (ISDN)) or the bus of a high-speed serial interface. Thus, the data transfer can be executed through the Internet by using the communication line. When the bus of the high-speed serial interface is used, the data transfer can be performed between other image generating systems, other game systems or information processing equipment (e.g., a personal computer, a printer, a mouse or a keyboard).

All the means used in the present invention may be executed only through hardware means or only through programs which have been stored in the information storage medium or externally distributed through the communication interface. Alternatively, all the means may be executed both by the hardware means and programs.

If all the means are executed both by the hardware means and programs, the information storage medium will store a program (or program and data) for executing the means of the present invention through the hardware means. More particularly, the program instructs the respective processors 902, 904, 906, 910 and 930 which are hardware means and delivers data to them, if necessary. Each of the processors 902, 904, 906, 910 and 930 will execute the corresponding means of the present invention based on the instruction and delivered data.

Figure 11A:
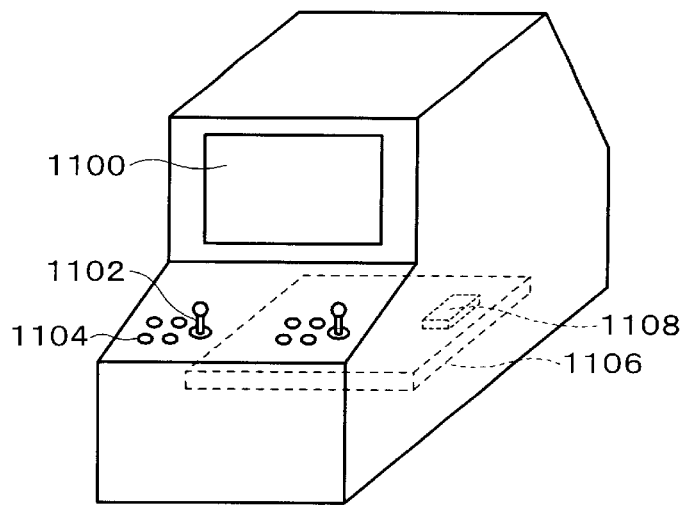
FIGS. 11A, 11B and 11C illustrate various forms of a system to which the embodiment can be applied.

FIG. 11A shows an arcade game system to which this embodiment is applied. Players enjoy a game by operating levers 1102, buttons 1104 and the like while viewing a game scene displayed on a display 1100. The game system includes a system board (or circuit board) 1106 on which various types of processors and memories are mounted. A program (or program and data) for executing the means of the present invention has been stored in a memory (or information storage medium) 1108 on the system board 1106. The information will be referred to "stored information".

Figure 11B:
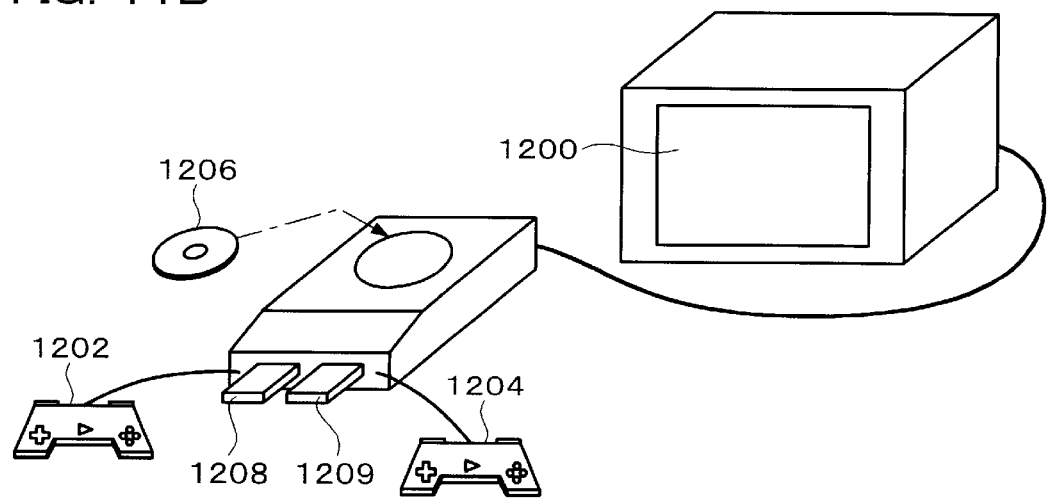

FIG. 11B shows a home game system to which this embodiment is applied. A player enjoys a game by manipulating game controllers 1202 and 1204 while viewing a game picture displayed on a display 1200. In such a case, the aforementioned stored information have been stored in CD 1206 or memory cards 1208, 1209 which are detachable information storage media in the game system.

Figure 11C:
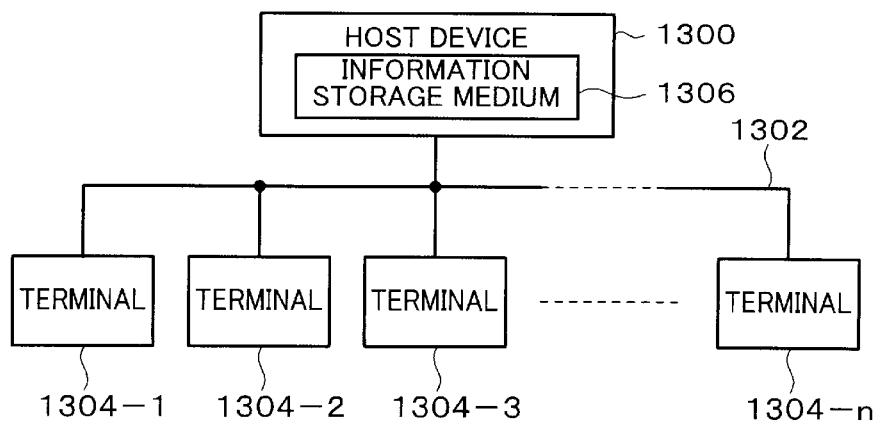

FIG. 11C shows an example wherein this embodiment is applied to a system which includes a host machine 1300 and terminals 1304-1 to 1304-n connected to the host machine 1300 through a network (which is a small-scale network such as LAN or a global network such as the Internet) 1302. In such a case, the above stored information have been stored in an information storage medium 1306 such as magnetic disk device, magnetic tape device, memory or the like which can be controlled by the host machine 1300, for example. If the terminals 1304-1 to 1304-n can generate game images and game sounds in a stand-alone manner, the host machine 1300 delivers game programs and others for generating game images and game sounds to the terminals 1304-1 to 1304-n. On the other hand, if the game images and sounds cannot be generated by the terminals in the stand-alone manner, the host machine 1300 will generate the game images and sounds which are in turn transmitted to the terminals 1304-1 to 1304-n.

In the arrangement of FIG. 11C, the means of the present invention may be decentralized into the host machine (or server) and terminals. The above information for executing the means of the present invention may be distributed and stored into the information storage media of the host machine (or server) and terminals.

Each of the terminals connected to the network may be either of home or arcade type. When the arcade game systems are connected to the network, it is desirable that each of the arcade game systems includes a portable information storage device (memory card or portable game machine) which can not only transmit the information between the arcade game systems but also transmit the information between the arcade game systems and the home game systems.

The present invention is not limited to the aforementioned embodiment, but may be carried out in any of various other changed forms.

For example, in an invention of the present invention relating to each of the sub-claims, part of the components in an independent claim to which the sub-claim belongs may be omitted. The primary part of an invention relating to an independent claim of the present invention] may belong to any other independent claim.

Although this embodiment has been described as to the saved-contents reminder image containing at least one of the landscape and character which remind the player of the contents of the saved game information being outputted at the load selection screen, the present invention is not limited to such a case. For example, the saved-contents reminder sound containing at least one of the sound effects, BGM and character's voices which remind the player of the contents of the save information may be outputted in the load selection screen.

Moreover, the image in the frame buffer has been maintained on data saving and will later be outputted as a saved-contents reminder image.

The saved-contents reminder image or sound may be generated based on the parameters of the character on the data saving of the game information.

The player may be to edit the saved-contents reminder image when the game data are saved.

Other than the role-playing game, the present invention may similarly be applied when the saved data is to be loaded in any of various other games such as fighting games, racing games, robot combat games, sports games, competitive games, role-playing games, music playing games, dancing games and so on.

Furthermore, the present invention can be applied to various image generating systems such as arcade game systems, home game systems, large-scaled multi-player attraction systems, simulators, multimedia terminals, image generating systems, game image generating system boards and so on.

What is claimed is:

1. A game system for playing a game by saving game state information when the game is terminated and by generating a saved-contents reminder image from items of the game state information saved when the game is terminated, the game system comprising:

image generation means which generates a saved-contents reminder image from the same state information saved when the game is terminated including one of at least a scene and a character which remind a player of contents of the saved data or a game state when the game is terminated;

output means which outputs the saved-contents reminder image upon restarting of the game; and further comprising:

means for generating a saved-contents reminder sound including at least one of sound effects, background music and character voice which remind the player of the contents of the saved data or the game state on the data saving; and output means which outputs the saved-contents reminder sound when the player selects the saved data to be loaded.

2. A game system in which desired saved data is selected from items of saved data and loaded, the game system comprising:

generating means which generates a saved-contents reminder sound including at least one of sound effects, background music and character voice that remind a player of contents of the saved data or a game state on the data saving; and output means which outputs the saved-contents reminder sound when the player selects the saved data to be loaded.

3. A game system for playing a game by loading desired saved data selected from items of saved data, the game system comprising:

image generation means which generates a saved-contents reminder image including at least one of a scene and a character which remind a player of a contents of the saved data or a game state on the data saving;

output means which outputs the saved contents reminder image when the player selects the saved data to be loaded; and wherein the saved-contents reminder image or a saved-contents reminder sound is generated based on a parameter of the character on the data saving.

4. The game system as defined in claim 2, wherein the saved-contents reminder image or the saved-contents reminder sound is generated based on a parameter of the character on the data saving.

5. A game system for playing a game by loading desired saved data selected from items of saved data, the game system comprising:

image generation means which generates a saved-contents reminder image including at least one of a scene and a character which remind a player of a contents of the saved data or a game state on the data saving;

output means which outputs the saved contents reminder image when the player selects the saved data to be loaded; and edition means which enables the player to edit at least one of the saved-contents reminder image and the saved-contents edition sound on the data saving.

6. The game system as defined in claim 2, further comprising:

edition means which enables the player to edit at least one of the saved-contents reminder image and the saved-contents edition sound no the data saving.

7. A computer-readable information storage medium for playing a game by saving game state information when the game is terminated and by generating a saved-contents reminder image from items of the game state information saved when the game is terminated, the information storage medium storing a program for implementing:

image generation means which generates a saved-contents reminder image from the game state information saved when the game is terminated including one of at least a scene and a character which remind a player of contents of the saved data or a game state when the game is terminated;

output means which outputs the saved-contents reminder image upon restarting of the game; and storing a program for implementing:

means for generating a saved-contents reminder sound including at least one of sound effects, background music and character voice which remind the player of the contents of the saved data or the game state on the data saving; and output means which outputs the saved-contents reminder sound when the player selects the saved data to be loaded.

8. An information storage medium in which desired saved data is selected from items of saved data and loaded, the information storage medium storing a program for implementing:

means for generating a saved-contents reminder sound including at least one of sound effects, background music and character voices that remind a player of contents of the saved data or a game state on the data saving; and output means which outputs the saved-contents reminder sound when the player selects the saved data to be loaded.

9. A computer-readable information storage medium for playing a game by loading desire data selected from items of saved data, the information storage medium storing a program for implementing:

image generation means which generates a saved-contents reminder image including one of at least a scene and a character which remind a player of contents of the saved data or a game state when the game is terminated;

output means which outputs the saved-contents reminder image upon restarting of the game; and storing a program for generating the saved-contents reminder image or the saved-contents reminder sound based on a parameter of the character on the data savings.

10. The information storage medium as defined in claim 8, storing:

a program for generating the saved-contents reminder image or the saved-contents reminder sound based on a parameter of the character on the data saving.

11. A computer-readable information storage medium for playing a game by loading desired data selected from items of saved data, the information storage medium storing a program for implementing:

image generation means which generates a saved-contents reminder image including one of at least a scene and a character which remind a player of contents of the saved data or a game state when the game is terminated;

output means which outputs the saved-contents reminder image upon restarting of the game; and edition means which enables the player to edit at least one of the saved-contents reminder image and the saved-contents editing sound on the data saving.

12. The information storage medium as defined in claim 8, storing a program for implementing:

edition means which enables the player to edit at least one of the saved-contents reminder image and the saved-contents edition sound on the data saving.

* * * * *